(12) United States Patent
Yamamoto et al.

(10) Patent No.: US 8,538,251 B2
(45) Date of Patent: Sep. 17, 2013

(54) FOCUS DETECTING APPARATUS AND DRIVING METHOD THEREFOR

(75) Inventors: Takuro Yamamoto, Funabashi (JP); Hidetoshi Hayashi, Fujisawa (JP); Tatsuhiko Yamazaki, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/565,125

(22) Filed: Aug. 2, 2012

(65) Prior Publication Data

US 2013/0063632 A1 Mar. 14, 2013

(30) Foreign Application Priority Data

Sep. 8, 2011 (JP) ................................. 2011-196498

(51) Int. Cl.
*G03B 3/10* (2006.01)
(52) U.S. Cl.
USPC ........................................................ 396/121
(58) Field of Classification Search
USPC ........................................................ 396/121
See application file for complete search history.

(56) References Cited

U.S. PATENT DOCUMENTS

| 6,577,344 | B2 | 6/2003 | Kadohara et al. |
| 7,064,777 | B2 | 6/2006 | Yamazaki |
| 7,512,330 | B2 * | 3/2009 | Ichimiya ........................ 396/96 |
| 7,940,320 | B2 * | 5/2011 | Ise ................................. 348/312 |
| 2008/0100736 | A1 * | 5/2008 | Ise ................................. 348/311 |
| 2011/0052168 | A1 * | 3/2011 | Sakaguchi ...................... 396/96 |
| 2011/0176040 | A1 * | 7/2011 | Ise ................................. 348/294 |

FOREIGN PATENT DOCUMENTS

JP 10-104502 A 4/1998

* cited by examiner

*Primary Examiner* — Rodney Fuller
(74) *Attorney, Agent, or Firm* — Fitzpatrick, Cella, Harper & Scinto (57) ABSTRACT

A focus detecting apparatus, comprising a first pair of sensor blocks each including a sensor unit and a detection unit, and a power supply unit configured to supply power to the detection unit, wherein when one of the first pair of sensor blocks operates in a first mode, the other operates in a second mode, the detection unit of the sensor block operating in the first mode detects an output of the sensor unit, the sensor unit of the sensor block operating in the second mode accumulates charges and terminates the charge accumulation operation in response to the detection operation, and the power supply unit shuts off power supply to the detection unit of the sensor block operating in the second mode for at least part of the period of time during the operation in the second mode.

11 Claims, 5 Drawing Sheets

FOCUS DETECTING APPARATUS AND DRIVING METHOD THEREFOR

BACKGROUND OF THE INVENTION

1. Field of the Invention

The present invention relates to a focus detecting apparatus and a driving method therefor.

2. Description of the Related Art

As a conventional focus detection method for a camera, there is known a technique of performing focus detection using a line sensor. Japanese Patent Laid-Open No. 10-104502 discloses a technique of extending a focus detection area using an area sensor. In either of the focus detecting apparatuses using those sensors, the number of detection units corresponds to that of sensors, and a number of distance measurement points are provided to detect that an output potential reaches a predetermined value.

To detect the focus, in these detection units, a through current consumes high power in a standby state until a detection signal is received. Particularly, if, for example, the number of distance measurement points is larger, it is necessary to provide a larger number of detection units, and therefore, power consumption is high when detecting the focus.

SUMMARY OF THE INVENTION

The present invention has as its object to reduce power consumption in the focus detection operation of a focus detecting apparatus.

One of the aspects of the present invention provides a focus detecting apparatus comprising a first pair of sensor blocks each including a sensor unit configured to photoelectrically convert incident light, and a detection unit, and a power supply unit configured to supply power to the detection unit, wherein when one of the first pair of sensor blocks operates in a first mode, the other one of the first pair of sensor blocks operates in a second mode, the detection unit of the sensor block operating in the first mode detects that an output of the sensor unit reached a predetermined value, the sensor unit of the sensor block operating in the second mode accumulates charges generated by photoelectrical conversion, and terminates the charge accumulation operation in response to the detection operation, and the power supply unit shuts off power supply to the detection unit of the sensor block operating in the second mode for at least part of a the period of time during which the sensor block operates in the second mode.

Further features of the present invention will become apparent from the following description of exemplary embodiments with reference to the attached drawings.

DESCRIPTION OF THE EMBODIMENTS

First Embodiment

Figure 1:
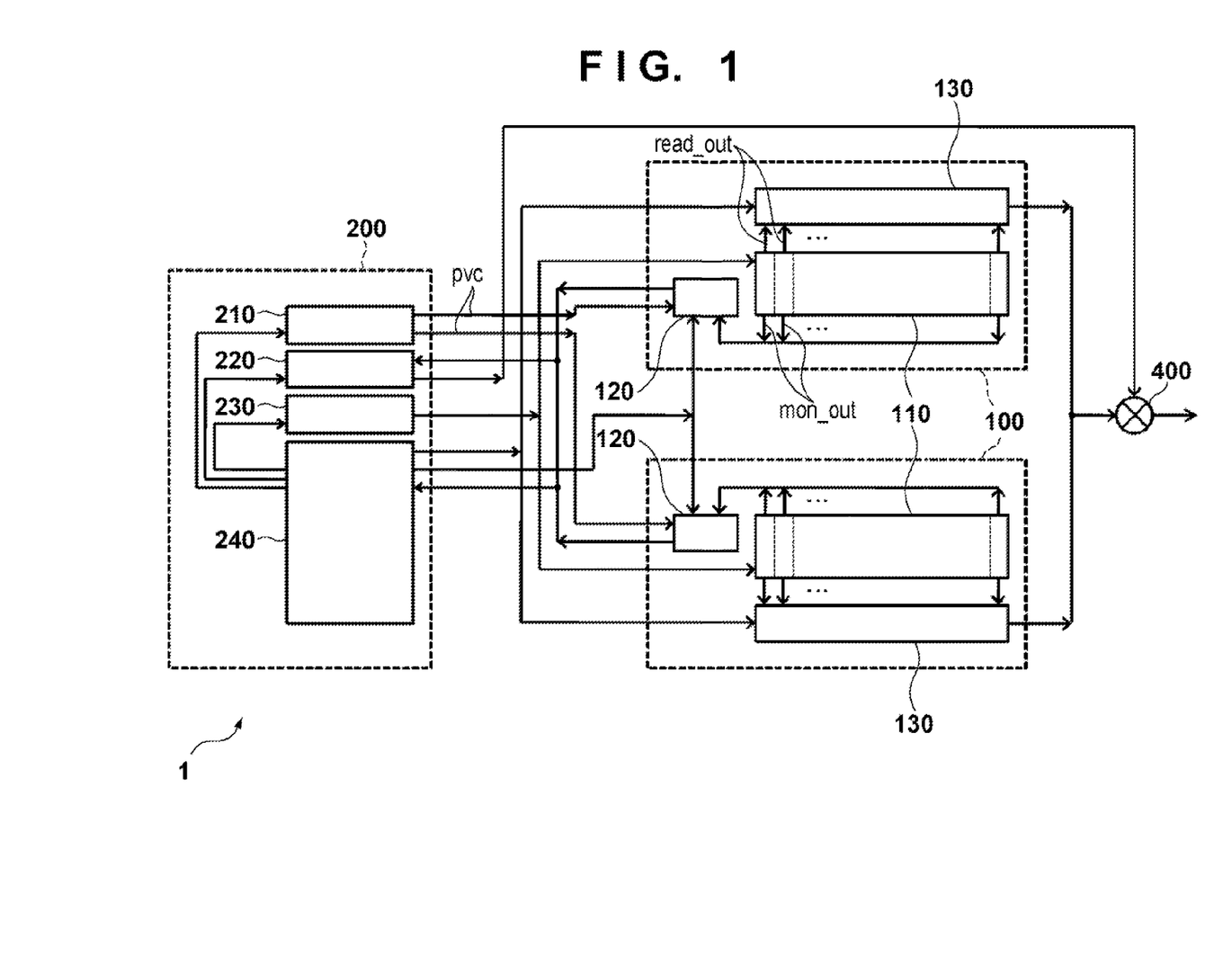
FIG. 1 is a view for explaining an example of an arrangement according to the first embodiment of the present invention.

A focus detecting apparatus 1 according to the first embodiment of the present invention will be described with reference to FIG. 1. The focus detecting apparatus 1 includes a pair of sensor blocks 100, and a power supply unit 210 for supplying power to each detection unit 120. Each of the pair of sensor blocks 100 includes a sensor unit 110 for photoelectrically converting incident light, and the detection unit 120. Each of the pair of sensor blocks 100 may include a reading unit 130 for reading out a signal corresponding to a charge amount accumulated in the corresponding sensor unit 110. For example, a control system 200 can include the power supply unit 210. The focus detecting apparatus 1 can also include an amplification unit 400 for amplifying and outputting the signal read out by the reading unit 130 of each of the pair of sensor blocks 100. The pair of sensor blocks 100 can be arranged to be adjacent to each other. The control system 200 can control the pair of sensor blocks 100 so that one of them operates in a first mode and the other one operates in a second mode. A mode switching unit 230 of the control system 200 can perform this control operation. The control system 200 can also include a controller 240 which can communicate with each of the above-described functional blocks to send an operation instruction.

The control system 200 controls a charge accumulation operation for focus detection in one of the two sensor units 110 which are adjacent to each other by detecting a charge amount which has been generated in the other one of the sensor units 110. More specifically, the detection unit 120 of one sensor block 100 which operates in the first mode detects that an output of the sensor unit 110 reached the predetermined value. This detection unit 120 can detect it by comparing the output of the sensor unit 110 with a preset reference potential. The sensor unit 110 of the other sensor block 100 which operates in the second mode accumulates charges generated by photoelectrical conversion. This charge accumulation operation ends in response to the detection operation by the detection unit 120 of the sensor block 100 operating in the first mode. The charge accumulation operation may end in response to, for example, an instruction from the controller 240 which has received a notification about the detection operation.

That is, in the sensor block 100 operating in the first mode, the detection unit 120 monitors the output of the sensor unit 110, and detects that the output reaches the predetermined value. This operation determines control information for controlling the charge accumulation operation in the sensor block 100 operating in the second mode. On the other hand, in the sensor block 100 operating in the second mode, a charge accumulation operation for focus detection is performed, and then ends according to a detection result in the sensor block 100 operating in the first mode. According to a signal corresponding to the accumulated charges, focus detection is performed.

At this time, the power supply unit 210 shuts off power supply to the detection unit 120 of the sensor block 100 operating in the second mode for at least part of the period of time during which this sensor block 100 operates in the second mode. In particular, power supply is not necessary while the detection unit 120 does not perform a detection operation, thereby enabling to shut off power. With this processing, one of the detection units 120 of the pair of sensor blocks 100 is supplied with power to enter an active state, and power supply to the other one of the detection units 120 is shut off to cause detection unit 120 to enter a non-active state. It is, therefore, possible to suppress power consumption in the sensor blocks 100. An amplification factor determination unit 220 included in the control system 200, for example, can determine the amplification factor of the amplification unit 400 according to a signal from the reading unit 130, which has been detected by the detection unit 120 of the sensor block 100 operating in the second mode. At this time, the power supply unit 210 can supply power to the detection unit 120 while the sensor block 100 operates in the second mode. A switch series-connected with a DC power supply, for example, may switch whether to supply or shut off power to the detection unit 120. In this embodiment, consider a case in which the switching operation is performed according to a signal pvc.

Figure 2:
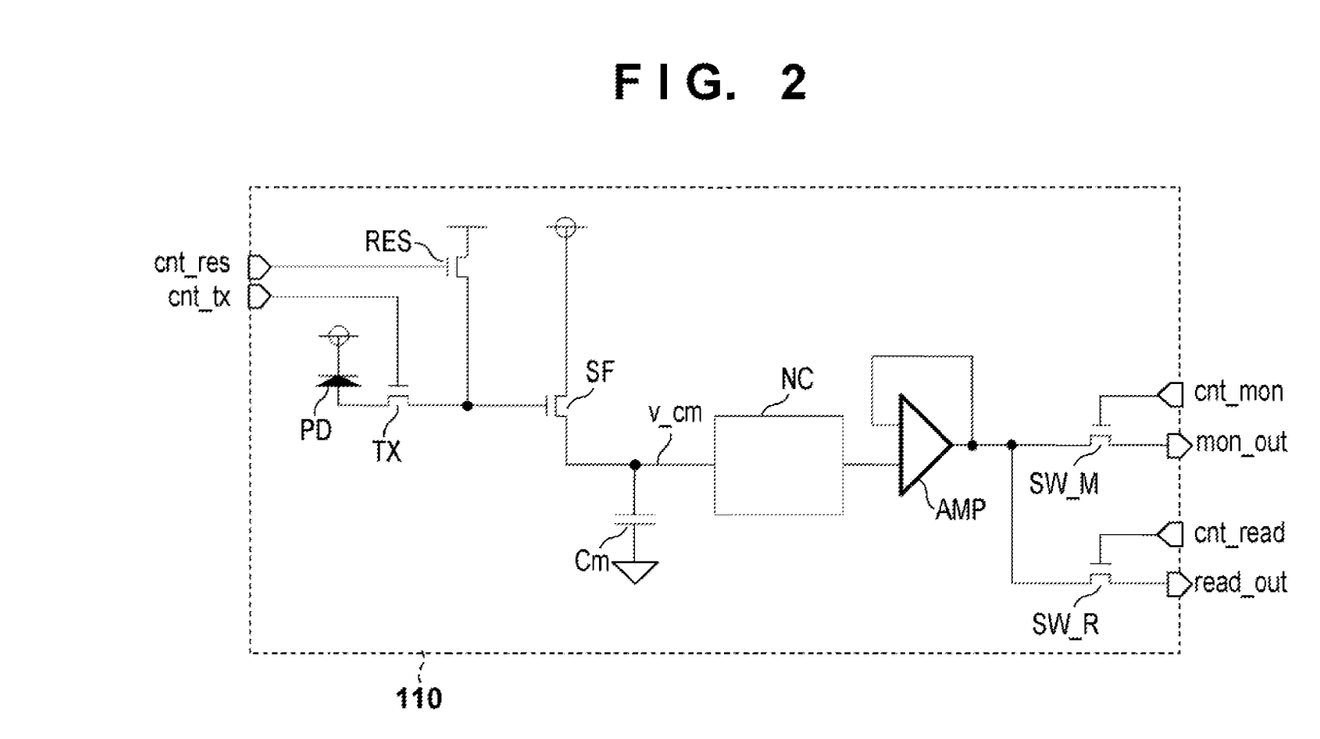
FIG. 2 is a circuit diagram for explaining an example of the arrangement of a sensor unit.

FIG. 2 shows an example of the arrangement of the sensor unit 110. The sensor unit 110 can include a photodiode PD, a transfer transistor TX, an amplification transistor SF, a capacitor Cm, a noise clamp circuit NC, an amplifier AMP, and switches SW_M and SW_R. Although FIG. 2 shows the arrangement of the sensor unit including one pixel, the sensor unit 110 can include a plurality of pixels arranged in a line or array. In fact, for example, two images can be formed by about 30 to 80 pixels, and can be used for focus detection using a phase-difference detection method. More specifically, a first pair of sensor blocks and a second pair of sensor blocks which have the same arrangement, and a calculation unit are further included, and the calculation unit can perform a phase-difference detection operation based on each of the first and second pairs of sensor blocks. More specifically, each of the first pair of sensor blocks alternately performs an operation in the first mode and an operation in the second mode. Each of the second pair of sensor blocks alternately performs an operation in the first mode and an operation in the second mode. Then, the calculation unit performs a phase-difference detection operation based on an output signal of the first pair of sensor blocks in the second mode and that of the second pair of sensor blocks in the second mode. Furthermore, the calculation unit can perform a second phase-difference detection operation based on an output signal of the first pair of sensor blocks in the first mode and that of the second pair of sensor blocks in the first mode.

Charges generated by the energy of light received by the photodiode PD are transferred to the gate of the amplification transistor SF via the transfer transistor TX. The transfer transistor TX can be turned on when, for example, a control signal cnt_tx is set to high level. Then, a signal amplified by the amplification transistor SF charges the capacitor Cm, and is simultaneously input to the noise clamp circuit NC. In the noise clamp circuit NC, the output of the amplification transistor SF when the gate of the amplification transistor SF was reset (to be described later) has been clamped as a noise level in advance. After that, in the noise clamp circuit NC, noise can be removed by reading out the difference between the noise level and the signal amplified by the amplification transistor SF. The amplifier AMP amplifies an output signal from the noise clamp circuit NC. For the sensor unit 110 including a plurality of pixels, the amplifier AMP can detect and output the maximum value or minimum value of signals which have been charged in the corresponding capacitor Cm. FIG. 2 shows the amplifier AMP which can detect and output the maximum value. An output signal of the amplifier AMP can be output to a terminal mon_out connected to the detection unit 120 via the switch SW_M, and to an output terminal read_out connected to the reading unit 130 via the switch SW_R. The switches SW_M and SW_R can be turned on when, for example, control signals cnt_mon and cnt_read are set to high level, respectively. Each pixel can include a reset transistor RES for resetting the potential of the gate of the amplification transistor SF to a predetermined voltage. The reset transistor RES can be turned on when, for example, a control signal cnt_res is set to high level. Although the control signals cnt_res, cnt_tx, cnt_mon, and cnt_read are not shown in FIG. 1, the controller 240 may output them.

Figure 3:
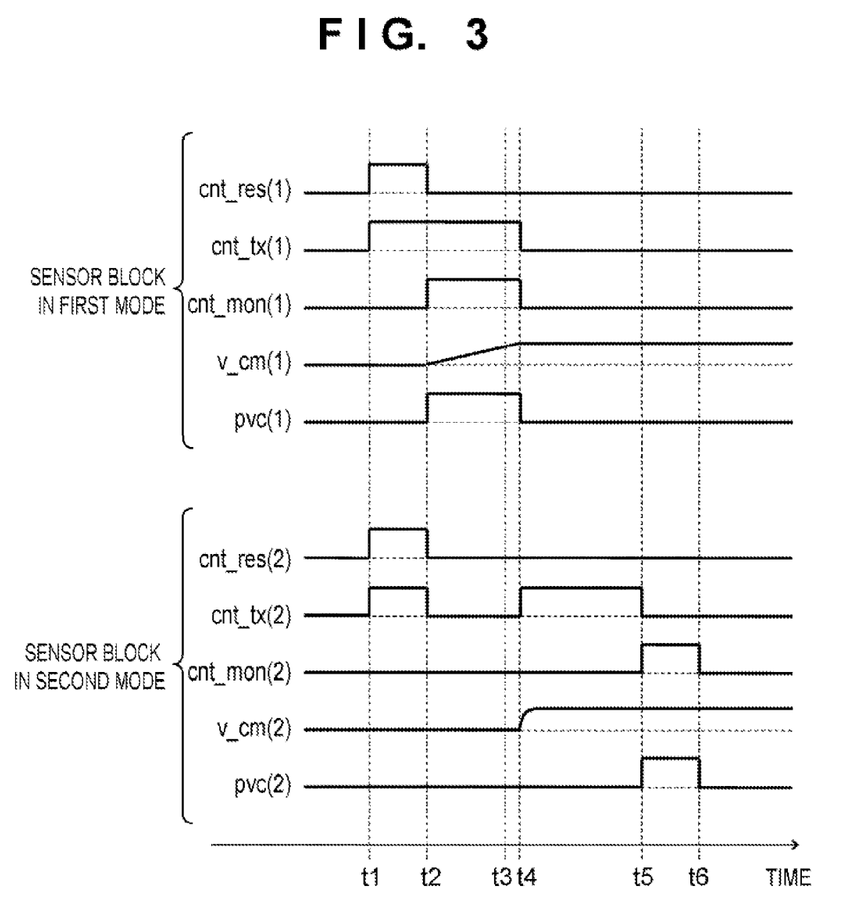
FIG. 3 is a timing chart for explaining an example of an operation according to the first embodiment of the present invention.

FIG. 3 is a timing chart showing the states of the control signals (cnt_res, cnt_tx, and cnt_mon), a potential v_cm of the capacitor Cm of the sensor unit 110, and the signal pvc indicating the state of power supply from the power supply unit 210 in an operation according to this embodiment. The upper portion of FIG. 3 shows the states in the sensor block 100 operating in the first mode and the lower portion of FIG. 3 shows the states in the sensor block 100 operating in the second mode. A number (1) inside the parentheses of each symbol in FIG. 3 indicates each state in the sensor block 100 operating in the first mode, and (2) indicates each state in the sensor block 100 operating in the second mode. An example of the operation according to this embodiment will be described below with reference to FIG. 3.

At a time t1, reset processing starts. At the time t1, cnt_res (1), cnt_tx(1), cnt_res(2), and cnt_tx(2) are set to high level, and the sensor unit 110 of either of the sensor blocks 100 in the first and second modes is reset. In this step, the capacitor Cm included in each sensor unit 110 is also initialized.

At a time t2, cnt_res(1) and cnt_res(2) are set to low level to cancel the reset state of the sensor unit of each of the sensor blocks 100 in the first and second modes. At the same time, cnt_mon(1) is set to high level, and the switch SW_M of the sensor unit 110 of the sensor block 100 operating in the first mode is turned on. Since cnt_tx(1) remains at high level, charges generated by photoelectrical conversion in the sensor unit 110 of the sensor block 100 in the first mode are transferred to the gate of the amplification transistor SF via the transfer transistor TX. Then, the amplified signal charges the capacitor Cm of the sensor unit 110, the potential v_cm(1) increases, and is then output to the corresponding detection unit 120 via the noise clamp circuit NC, amplifier AMP, and switch SW_M. In this step, the detection unit 120 of the sensor block 100 in the first mode is in a state in which when pvc(1) is set to high level to supply power to the detection unit 120, it can detect that the output of the sensor unit 110 reaches the predetermined value. Furthermore, at the time t2, cnt_tx (2) is set to low level to start accumulating charges generated by photoelectrical conversion in the sensor unit 110 of the sensor block 100 in the second mode.

At a given time, the detection unit 120 of the sensor block 100 operating in the first mode detects that the output of the sensor unit 110 reaches the predetermined value. This time is set as a time t3. This detection operation can be performed when, for example, the detection unit 120 compares the output of the sensor unit 110 with a preset reference potential (not shown).

At a time t4, in response to the detection operation performed at the time t3, cnt_tx(1) and cnt_mon(1) are set to low level. This terminates the operation of transferring the charges generated by photoelectrical conversion in the sensor unit 110 to the gate of the amplification transistor SF in the sensor block 100 in the first mode, thereby terminating the detection operation by the detection unit 120. At this time, pvc(1) is set to low level, thereby shutting off power supply to the detection unit 120. On the other hand, at the time t4, cnt_tx(2) is set to high level. This terminates the accumulation operation of the charges generated by photoelectrical conversion in the sensor unit 110 in the sensor block 100 in the second mode, and starts to transfer the accumulated charges to the gate of the amplification transistor SF via the transfer transistor TX. The potential v_cm(2) thus rises.

At a time t5, cnt_tx(2) is set to low level. This terminates the operation of transferring the charges which have been generated by photoelectrical conversion and then accumulated in the sensor unit 110 to the gate of the amplification transistor SF in the sensor block 100 in the second mode. Then, a step of determining the amplification factor of the amplification unit 400 for amplifying and reading out a signal corresponding to the accumulated charge amount can start. As described above, the amplification factor may be determined according to the signal from the reading unit 130, which has been detected by the detection unit 120 of the sensor block 100 operating in the second mode. In this case, it is necessary to supply power from the power supply unit 210 to the detection unit 120 by setting pvc(2) to high level.

At a time t6, cnt_mon(2) and pvc(2) are set to low level to terminate the step of determining the amplification factor. After that, for example, in response to an instruction from the controller 240, a step of reading out the signal corresponding to the charge amount accumulated in the sensor unit 110 of the sensor block 100 in the second mode can start.

According to the above-described procedure, power supply to the detection unit 120 of the sensor block 100 operating in the second mode is shut off for at least part of the period of time during which the sensor block 100 operates in the second mode. This enables to suppress the power consumption of the focus detecting apparatus 1.

Second Embodiment

Figure 4:
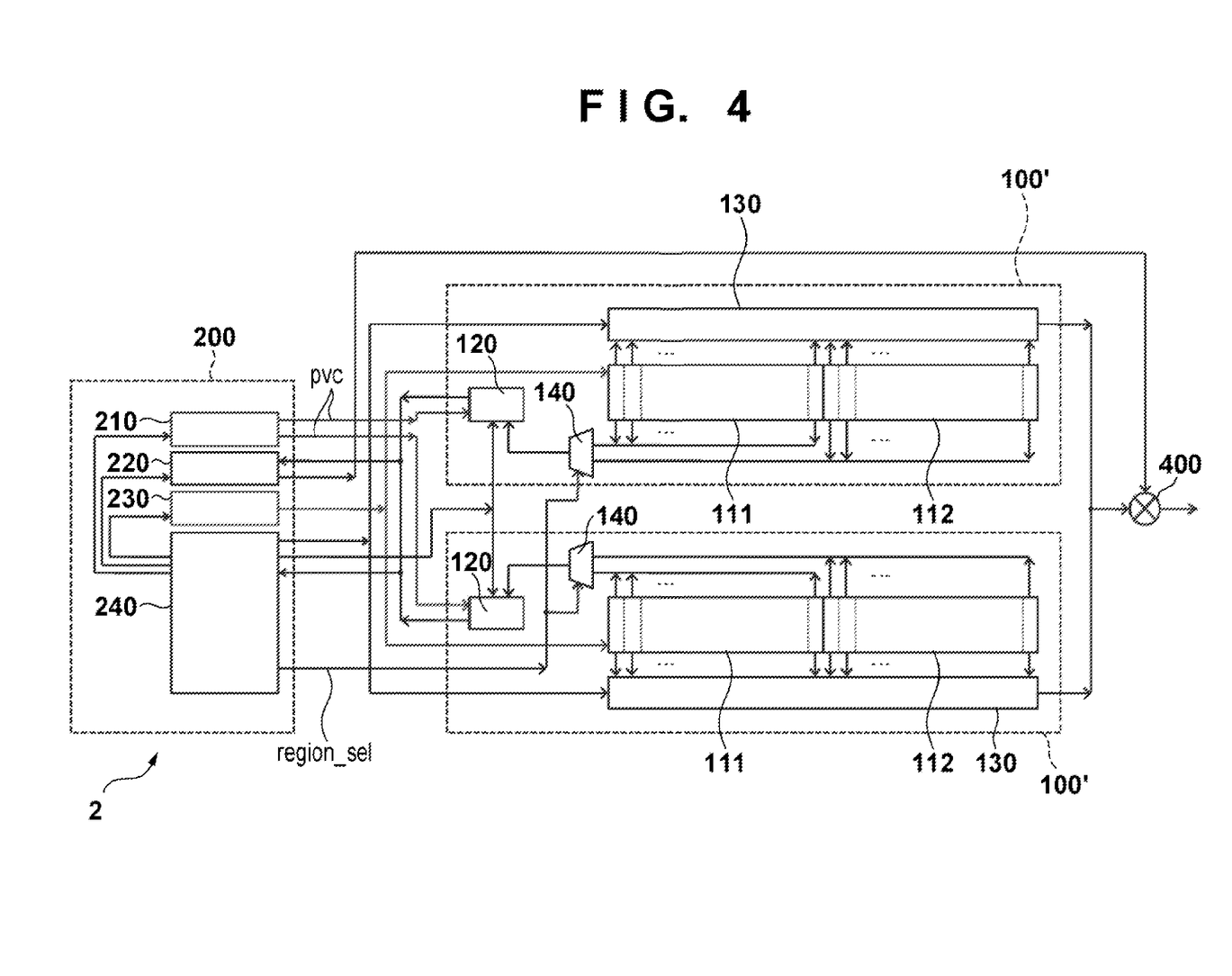
FIG. 4 is a view for explaining an example of an arrangement according to the second embodiment of the present invention.

A focus detecting apparatus 2 according to the second embodiment of the present invention will be described with reference to FIG. 4. This embodiment is different from the first embodiment in that a sensor unit 110 includes a first sensor area 111 and a second sensor area 112, and a sensor block 100' serves as each of the pair of sensor blocks 100 which additionally includes a selector 140. Each selector 140 can select and output one of outputs of the first sensor area 111 and second sensor area 112. Each detection unit 120 can detect the output, selected by the selector 140, of the first sensor area 111 or second sensor area 112 of the sensor block 100' to which the detection unit 120 belongs. For example, a controller 240 can output a control signal region_sel.

By adopting such arrangement, the first sensor area 111 and second sensor area 112 can share the detection unit 120 of the sensor block 100' to which the areas 111 and 112 belong. This enables to selectively form a first image for focus detection using a phase-difference detection method by the first sensor area 111 and a second image for focus detection using a phase-difference detection method by the second sensor area 112. Furthermore, in this embodiment, the sensor unit 110 includes the two areas. The sensor unit 110 may include more than two areas, which enables to selectively perform a phase-difference detection operation in the row direction and that in the column direction.

Figure 5:
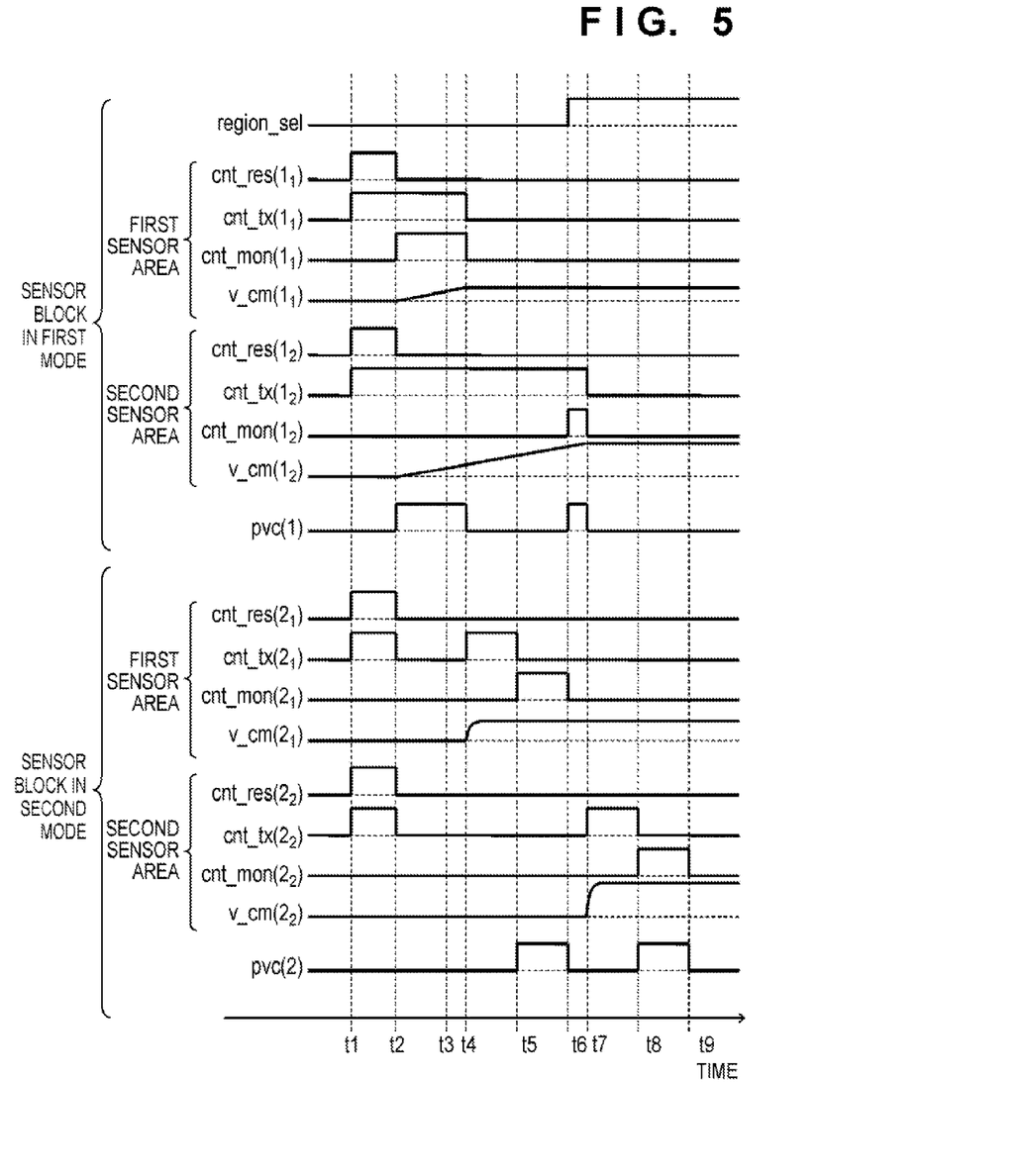
FIG. 5 is a timing chart for explaining an example of an operation according to the second embodiment of the present invention.

FIG. 5 is a timing chart showing the states of control signals, potentials v_cm of capacitors Cm of the first sensor area 111 and second sensor area 112, and a signal pvc indicating the state of power supply from a power supply unit 210 in an operation according to this embodiment. The upper portion of FIG. 5 shows the states in the sensor block 100' operating in a first mode and the lower portion of FIG. 5 shows the states in the sensor block 100' operating in a second mode. A number ($1_1$) inside the parentheses of each symbol in FIG. 5 indicates each state in the first sensor area 111 of the sensor block 100' operating in the first mode. Furthermore, ($2_1$) indicates each state in the first sensor area 111 of the sensor block 100' operating in the second mode. Similarly, ($1_2$) indicates each state in the second sensor area 112 of the sensor block 100' operating in the first mode, and ($2_2$) indicates each state in the second sensor area 112 of the sensor block 100' operating in the second mode.

In this embodiment, consider a case in which processing for each first sensor area 111 is performed from a time t1 to t6, and processing for each second sensor area 112 is performed from the time t6 to t9. In this case, the control signal region_sel can be switched from low level to high level at the time t6. An example of the operation according to this embodiment will be described below with reference to FIG. 5. The operation of each of the first sensor areas 111 in the sensor blocks 100' in the first and second modes from the time t1 to t6 is the same as that in the above-described first embodiment (the time t1 to t6 in FIG. 3), and a description thereof will be omitted.

At the time t1, the second sensor area 112 of either of the sensor blocks 100' in the first and second modes is reset. In this step, the capacitor Cm included in each second sensor area 112 is also initialized. At the time t2, cnt_res($1_2$) and cnt_res($2_2$) are set to low level to cancel the reset state of the second sensor area 112 of each of the sensor blocks 100 in the first and second modes. Since cnt_tx($1_2$) remains at high level, charges generated by photoelectrical conversion in the second sensor area 112 of the sensor block 100' in the first mode can be transferred to the gate of an amplification transistor SF via a transfer transistor TX. This causes the potential v_cm($1_2$) to rise.

At the time t6, the control signal region_sel is switched to high level, and cnt_mon($1_2$) and pvc(1) are set to high level. In the sensor block 100' in the first mode, therefore, the output of the second sensor area 112 selected by the selector 140 is input to the detection unit 120 which has been supplied with power. This can start the processing for each second sensor area 112. On the other hand, since the potential v_cm($1_2$) has increased after the time t2, the detection unit 120 can detect that the output of the second sensor area 112 reaches a predetermined value.

At the time t7, in response to the detection operation performed at the time t6, cnt_tx($1_2$) and cnt_mon($1_2$) are set to low level. This terminates the operation of transferring the charges generated by photoelectrical conversion in the second sensor area 112 to the gate of the amplification transistor SF in the sensor block 100' in the first mode, thereby terminating the detection operation by the detection unit 120. At this time, pvc(1) is set to low level, thereby shutting off power supply to the detection unit 120. On the other hand, at the time t7, cnt_tx($2_2$) is set to high level. This terminates the accumulation operation of the charges generated by photoelectrical conversion in the second sensor area 112 in the sensor block 100' in the second mode, and starts to transfer the accumulated charges to the gate of the amplification transistor SF via the transfer transistor TX. The potential v_cm($2_2$) thus rises.

At the time t8, cnt_tx($2_2$) is set to low level. This terminates the operation of transferring the charges which have been generated by photoelectrical conversion and then accumulated in the second sensor area 112 to the gate of the amplification transistor SF in the sensor block 100' in the second mode. Then, a step of determining the amplification factor of an amplification unit 400 for amplifying and reading out a signal corresponding to the accumulated charge amount can start. As described above, the amplification factor may be determined according to the signal from the reading unit 130, which has been detected by the detection unit 120 of the sensor block 100' operating in the second mode. In this case, it is necessary to supply power from the power supply unit 210 to the detection unit 120 by setting pvc(2) to high level.

At the time t9, cnt_mon($2_2$) and pvc(2) are set to low level to terminate the step of determining the amplification factor. After that, for example, in response to an instruction from a controller 240, a step of reading out the signal corresponding to the charge amount accumulated in the second sensor area 112 of the sensor block 100' in the second mode can start.

According to this embodiment, the focus detecting apparatus 2 can suppress power consumption similarly to the first embodiment while performing focus detection for a plurality of sensor areas.

Although the two embodiments have been described above, the present invention is not limited to them. The objects, states, applications, functions, and other specifications of the present invention can be changed as needed, and other embodiments can implement the present invention, as a matter of course. The sensor unit, for example, is formed as a CMOS image sensor, and may be implemented as any other sensor. In cooperation with or instead of the controller, an OS or the like operating on a computer may perform all or part of the operation control of each functional block described above.

Although the focus detecting apparatus included in a camera has been described in the above embodiments, the camera conceptually includes not only a device whose principal purpose is photographing but also a device (for example, a personal computer or portable terminal) additionally provided with a photographing function. The camera can include the focus detecting apparatus according to the present invention, which has been exemplified in the above embodiments, a solid-state image sensor, and a processing unit for processing a signal output from the solid-state image sensor. The processing unit can include, for example, an A/D converter, and a processor for processing digital data output from the A/D converter. The processing unit may execute focus detection processing, and a calculation unit for executing the focus detection processing may be included in the focus detecting apparatus. A change can be made, as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-196498, filed Sep. 8, 2011, which is hereby incorporated by reference herein in its entirety.

What is claimed is:

1. A focus detecting apparatus comprising:
a first pair of sensor blocks each including a sensor unit configured to photoelectrically convert incident light, and a detection unit; and
a power supply unit configured to supply power to said detection units,
wherein when one of said first pair of sensor blocks operates in a first mode, the other one of said first pair of sensor blocks operates in a second mode,
wherein said detection unit of said sensor block operating in the first mode detects that an output of said sensor unit reached a predetermined value,
wherein said sensor unit of said sensor block operating in the second mode accumulates charges generated by photoelectrical conversion, and terminates the charge accumulation operation in response to the detection operation, and
wherein said power supply unit shuts off power supply to said detection unit of said sensor block operating in the second mode for at least part of a period of time during which said sensor block operates in the second mode.

2. The apparatus according to claim 1, wherein said sensor unit includes a plurality of pixels arranged in a line or an array.

3. The apparatus according to claim 1, further comprising an amplification unit configured to amplify and output a signal corresponding to a charge amount accumulated in said sensor unit of said sensor block operating in the second mode,
wherein said power supply unit supplies power to said detection unit of said sensor block after said sensor unit of said sensor block terminates the charge accumulation operation, and
wherein an amplification factor of said amplification unit is determined according to the signal detected by said detection unit.

4. The apparatus according to claim 1, wherein said sensor unit includes a first sensor area and a second sensor area,
wherein each of said first pair of sensor blocks further includes a selector, and
wherein said detection unit detects an output, selected by said selector, of said first sensor area or said second sensor area of said sensor block to which said detection unit belongs.

5. The apparatus according to claim 1, wherein said at least part of the period of time includes a period of time from when said sensor unit in said sensor block operating in the first mode starts to accumulate charges generated by photoelectrical conversion until said detection unit detects that the output of said sensor unit reaches the predetermined value.

6. The apparatus according to claim 1, further comprising a second pair of sensor blocks having the same arrangement as that of said first pair of sensor blocks; and
a calculation unit,
wherein each of said first pair of sensor blocks alternately performs an operation in the first mode and an operation in the second mode, and each of said second pair of sensor blocks alternately performs an operation in the first mode and an operation in the second mode, and
wherein said calculation unit performs a phase-difference detection operation based on a signal output by the one of said first pair of sensor blocks operating in the second mode and a signal output by the one of said second pair of sensor blocks operating in the second mode, and performs a second phase-difference detection operation based on a signal output by the one of said first pair of sensor blocks operating in the first mode and a signal output by the one of said second pair of sensor blocks operating in the first mode.

7. A camera comprising:
a focus detecting apparatus according to claim 1;
a solid-state image sensor; and
a processing unit configured to process a signal output from said solid-state image sensor.

8. A driving method for a focus detecting apparatus that includes a first pair of sensor blocks each including a detection unit and a sensor unit configured to photoelectrically convert incident light, and a power supply unit configured to supply power to the detection units, one of the first pair of sensor blocks operating in a first mode, and the other one of the first pair of sensor blocks operating in a second mode, the method comprising:

detecting, by the detection unit of the sensor block operating in the first mode, that an output of the sensor unit reached a predetermined value;

accumulating, by the sensor unit of the sensor block operating in the second mode, charges generated by photoelectrical conversion, and terminating the charge accumulation operation in response to the detection operation in the detecting; and     shutting off power supply by the power supply unit to the detection unit of the sensor block operating in the second mode for at least part of a period of time during which the sensor block operates in the second mode.

9. The method according to claim 8, wherein the focus detecting apparatus further includes an amplification unit configured to amplify and output a signal corresponding to a charge amount accumulated in the accumulating step, and     wherein the method further comprises determining an amplification factor of the amplification unit according to the signal detected by the detection unit by supplying power from the power supply unit to the detection unit of the sensor block after the accumulating step.

10. The method according to claim 8, wherein the sensor unit includes a first sensor area and a second sensor area, and each of the first pair of sensor blocks further includes a selector, and     wherein the method further comprises selecting, by the selector, before the detecting step, one of the outputs of the first sensor area and the second sensor area of the sensor block to which the detection unit belongs.

11. The method according to claim 8, wherein said at least part of the period of time includes a period of time from when the sensor unit in the sensor block operating in the first mode starts to accumulate charges generated by photoelectrical conversion until the detection unit detects that the output of the sensor unit reaches the predetermined value.

\* \* \* \* \*